April 9, 1957
D. H. SWANK
2,787,889
AIRCRAFT COMPARTMENT COOLING MECHANISM
Filed Aug. 15, 1955
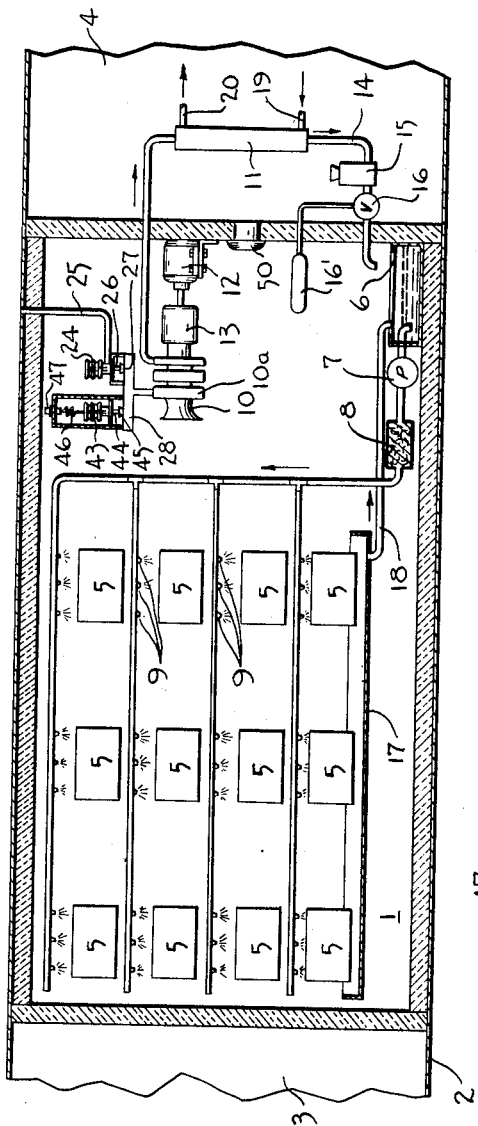
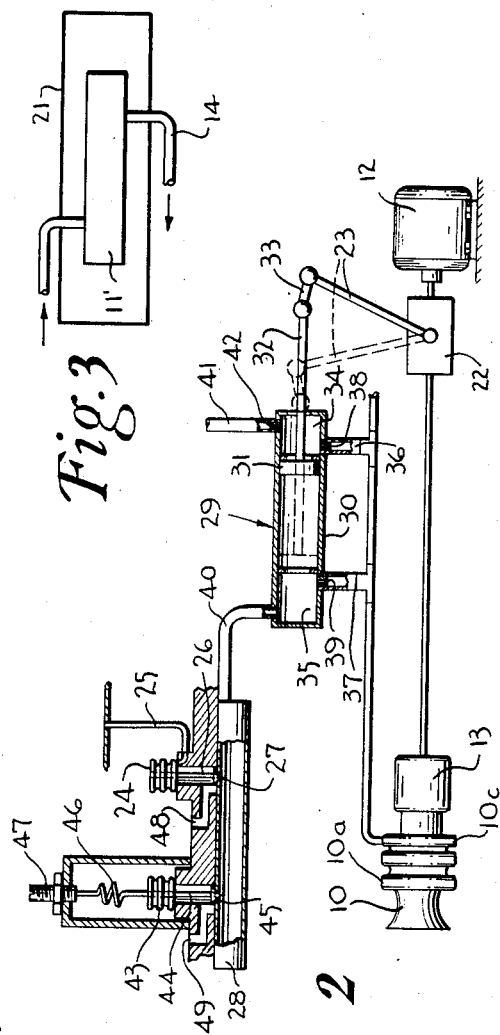
INVENTOR.
DOUGLAS H. SWANK
BY
Reynolds, Beach & Christensen
ATTORNEYS

2,787,889

AIRCRAFT COMPARTMENT COOLING MECHANISM

Douglas H. Swank, Seattle, Wash., assignor to Boeing Airplane Company, Seattle, Wash., a corporation of Delaware Application August 15, 1955, Serial No. 528,358

15 Claims. (Cl. 62—4)

The present invention relates to mechanisms for cooling a compartment in an airplane and is concerned particularly with the cooling of a sealed compartment not occupied by a person. Such compartment cooling mechanism is particularly useful for cooling compartments in aircraft which fly at supersonic speeds and high altitudes.

In airplanes which fly at supersonic speeds even at high altitudes the friction of the aircraft skin passing through the air generates considerable heat. Not only is such heat sufficient to cause discomfort to personnel carried by the aircraft, but it may be damaging to cargo and even affect adversely some components of the aircraft itself. High temperatures may, for example, impair the reliability of operation of various types of electronic control equipment relied upon to operate the airplane or for other purposes such as to record data, control armament of the aircraft, or employed for navigational purposes.

The principal object of the present invention is to provide control mechanism for a cooling system of the refrigeration type particularly useful for cooling an aircraft compartment. More specifically, such control mechanism will control the pressure within the cooled compartment, especially to prevent reduction of such pressure by the refrigeration system below exterior pressure and in any event below a predetermined minimum pressure.

A more specific object is to provide control mechanism for thus controlling the pressure within a cooled compartment by regulating the operation of a compressor in transferring gaseous refrigerant from the compartment to a compressor, either by releasing to the compartment gas compressed by the compressor or by varying the speed of the compressor, or both.

Another object is to provide control mechanism for a refrigeration system which normally will enable the refrigeration system to produce maximum cooling effect but will control operation of the refrigeration mechanism so that it will not produce undesirable pressure conditions within the refrigerated compartment.

An additional object is to provide control mechanism for controlling cooling of a compartment which is sealed against communication with the exterior atmosphere so that the pressure in it can be regulated independently of the exterior pressure to the extent desired.

A more particular object of the invention is to utilize for control pressure sensitive means exposed to pressure within the compartment being cooled and which for certain purposes may also be exposed to external pressure.

Another object is to effect cooling of a compartment by evaporation of refrigerant into it and to control the pressure within the compartment by regulating the withdrawal of gaseous refrigerant from it.

Still a further object is to provide in such a compartment cooling refrigeration system an effective expedient for cooling the refrigerant in the system to convert it from gaseous form at relatively high pressure to liquid form at relatively low pressure.

A refrigeration system, an aircraft compartment and control mechanism capable of accomplishing the aforementioned objects have been shown rather diagrammatically in the accompanying drawings as applied to a representative installation. In general, the refrigeration system includes means for evaporating refrigerant into the aircraft compartment, a compressor for withdrawing gaseous refrigerant from the compartment and transferring it to a condenser in which heat is removed from the refrigerant by a medium such as fuel for the aircraft, and the refrigerant is converted to liquid form. Pressure sensitive control mechanism exposed to pressure within the compartment and to external pressure and responsive to the difference in such pressures will regulate the compressor either by releasing to the compartment gas compressed by it or by regulating its speed, or both, to prevent the pressure in the compartment from being reduced to a pressure less than the external pressure. Additional pressure sensitive control means exposed to pressure within the compartment may similarly control operation of the compressor to prevent the pressure within the compartment from being reduced to a value less than a predetermined value, and particularly such a value as would cause the ratio of the desired condenser feed pressure to the compartment pressure tending to exceed the compression ratio of the compressor.

Figure 1 is a diagrammatic vertical sectional view through an aircraft compartment to be cooled, showing a representative installation of refrigeration and control mechanism.

Figure 2 is a diagrammatic view of an alternative installation of control mechanism and a portion of the refrigeration system controlled thereby, parts being broken away.

Figure 3 is a diagrammatic view of an alternative type of installation for a portion of the refrigeration system.

While the cooling system of the present invention could be used for cooling airplane compartments of various types, its application to the cooling of a compartment containing electronic devices is described in detail below. A similar arrangement could be used for cooling a compartment between the fuselage wall of an airplane and a passenger cabin, or a similar compartment surrounding a cargo storage space, or the cargo storage space directly. The same principles will be used in all such cases. In the particular instance illustrated, the compartment 1 is located within the airplane fuselage 2 and is sealed both from the exterior of the fuselage and from other portions 3 and 4 of the fuselage. The compartment houses containers 5, each of which preferably is sealed within the compartment and encloses electronic devices the temperature of which is to be regulated.

Cooling of the compartment 1 is effected by a refrigeration system utilizing a vaporizable refrigerant for direct cooling. The refrigerant in liquid form may be stored in a receiver 6 within the compartment 1 and subjected to the same pressure conditions. Refrigerant may be withdrawn from such receiver by a pump 7 and passed through a filter 8. Under the pressure developed by the pump 7 the refrigerant may be discharged from any number of suitable atomizing nozzles 9. The finely divided refrigerant thus liberated into the compartment for evaporation will in such evaporation process absorb heat from the compartment.

In order to cool the various containers 5 most effectively, it is preferred that they be relatively small and located with respect to nozzles 9 so that a spray or sprays of refrigerant will be projected directly upon them. The electronic mechanism in each container may perform a specified function in the aircraft, and the equipment in different containers may perform different functions. All of the electronic components adversely affected by heat can, however, be grouped suitably in the compartment 1 instead of, as is usually the case, having such components distributed in various parts of the airplane. By arranging the compartments in a plurality of separate containers the cooling of all of such components is controlled more effectively so as to prevent them from being overheated either by heat generated by such components themselves or by heat generated by friction of the aircraft fuselage passing rapidly through the air or from a combination of such heating factors.

To enable the compartment to be cooled over an extended period without the necessity of providing a large quantity of refrigerant, the refrigeration system incorporates a compressor 10 which withdraws refrigerant vapor from the compartment 1 and transfers it under pressure to the condenser 11. The compressor may be of the centrifugal type and, as shown in Figures 1 and 2, may include three compression stages. The compressor may be driven by motor 12 through suitable gearing or transmission mechanism 13. Preferably, as shown in Figure 1, the compressor and its drive mechanism are located within the cooled compartment 1 so that these components also will be cooled by the refrigeration system. Refrigerant liquified in the condenser 11 is returned to the receiver 6 through a conduit 14 and during such return flow air is removed from the liquified refrigerant by the air separator 15. Moreover, the pressure of the refrigerant discharged from the conduit 14 is equalized with the atmospheric pressure in the compartment 1 by the pressure equalizing valve 16 controlled by the pressure sensing element 16'. In addition to return of liquid refrigerant to the receiver 6 through conduit 14 a drip catching tray 17 may be installed beneath the containers 5 to catch any unevaporated refrigerant and drain it back to the receiver through the conduit 18.

In order for the condenser 11 to be able to convert the refrigerant from gaseous form under high pressure to liquid form, it is necessary that the compressed gaseous refrigerant be cooled to remove from it the latent heat of vaporization. The condenser may incorporate a heat exchange unit through which cooling liquid is circulated preferably in a direction contra to the direction of flow of the refrigerant. The cooling medium used may be fuel for the aircraft which is supplied to the heat exchanger through the connection 19 and withdrawn from the heat exchanger through the connection 20. Alternatively, as shown in Figure 3, the condenser 11' could simply be submerged in the fuel within a fuel tank 21.

The compressor 10 of the refrigeration system should have a capacity sufficient to maintain adequate cooling effect in the compartment 1 under the most extreme heating conditions which can be expected. Consequently, if no automatic control mechanism is provided, it is quite possible that without adjustment the compressor driven continually at maximum operating speed could exhaust the compartment of refrigerant vapor and air to the point where the pressure in the compartment actually was lower than the pressure on the exterior of the compartment. Such a situation would produce an undesirable collapsing load on the wall of the compartment, and for that reason such a condition should be avoided.

Furthermore, at high altitudes where the exterior ambient atmospheric pressure is quite low, the compressor might exhaust refrigerant vapor and air from the compartment to such an extent that while the pressure was still at a value higher than that of the external ambient atmosphere, it might be sufficienly low that the pressure increase which could be produced by the compressor would be lower than the drop in pressure through the condenser resulting from conversion of the compressed gas to liquid. Under such circumstances the compressor would tend to surge, and the operation of the condenser might be affected adversely.

For these reasons it is desirable to provide automatic control mechanism for the refrigeration system which will limit the reduction in pressure in compartment 1 which the compressor is capable of effecting both in the minimum absolute value of the pressure in the compartment and the value of such pressure relative to the external atmospheric pressure. In such automatic control mechanism it is preferred that separate controls be provided, one of which will operate to insure that the pressure within the compartment 1 can never be reduced appreciably below external atmospheric pressure, and the other of which will operate to limit the reduction in pressure within the compartment to a predetermined absolute value, even though the atmospheric pressure externally of the compartment might be considerably below such minimum absolute value. In normal operation, however, the pressure of the atmosphere within compartment 1 will ordinarily be substantially equal to the external atmospheric pressure.

The automatic control mechanism in limiting the reduction of pressure in the compartment 1 preferably controls operation of the compressor to curtail transfer of refrigerant to the condenser 11. Such reduction in transfer of refrigerant may be accomplished either by releasing into the compartment 1 refrigerant compressed by the compressor without it being converted to liquid form, or by reducing the speed of the compressor, or both. While the speed of the compressor could be regulated by providing an infinitely variable speed transmission and suitable control mechanism for such a transmission, regulation of the compressor speed is simplified by interconnecting between the drive motor 12 and the compressor 10 a two-speed transmission 22, as shown in Figure 2. When the control lever 23 for this transmission is swung to the right in the full-line position the motor will drive the compressor at its maximum operating speed, whereas if this lever is swung fully to the left into the broken-line position the motor will drive the compressor at its minimum or preselected reduced operating speed.

When the amount of heat being generated by the electronic equipment in the containers 5 is large or the aircraft is flying fast, or both, the refrigerant discharged by the nozzles 9 evaporates rapidly. Such refrigerant may, for example, be Freon. Particularly if the aircraft also is flying at a high altitude so that the external pressure is low, it may be desirable for the compressor to operate at its maximum capacity to withdraw refrigerant vapor from the compartment 1 and transfer it to the condenser 11 at high pressure. When the amount of heat generated by the electronic components in the containers 5 is small, however, or the airplane is flying slowly, or at low altitude, it is not necessary for the compressor to utilize its maximum capacity to compress refrigerant vapor and transfer it to the condenser 11, because the refrigerant will evaporate in the compartment 1 relatively slowly, and it would be undesirable to reduce the pressure in the compartment 1 to a low value.

Considering a specific example, the pressure drop effected in the condenser by converting compressed refrigerant to liquid form may be at least thirty pounds per square inch. If the maximum compression ratio of the compressor is eleven to one, it will be necessary to prevent reduction in the absolute pressure within the compartment 1 below three pounds per square inch, because the delivery pressure of the compressor would be only thirty-three pounds per square inch. Such delivery pressure would allow a drop from thirty-three pounds per square inch to three pounds per square inch in the condenser during conversion of the gaseous refrigerant to liquid. To obtain such a compression ratio a three-stage compressor ordinarily will be required. If the pressure in the compartment is three pounds per square inch, therefore, it will be necessary for the compressor to operate at maximum speed and capacity in order to deliver compressed refrigerant at a pressure high enough for processing by the condenser without surging of the compressor. When the pressure within the compartment 1 is higher, however, the compressor could increase the pressure of the compressed refrigerant sufficiently to be handled by the condenser while operating at a lower speed.

The most important consideration is to regulate the operation of the compressor so that the pressure in the compartment 1 will not be reduced to a value appreciably below the external atmospheric pressure at any altitude. This result may be accomplished by providing differential pressure sensitive means having one surface exposed to pressure within the compartment 1 and an opposite surface exposed to the external atmospheric pressure and responsive to the difference in such pressures. Such pressure sensitive means may be the bellows 24 shown in Figures 1 and 2, having its exterior exposed to the pressure in the compartment 1 and having its interior in communication through a conduit 25 with the external atmosphere so as to subject the interior of the bellows to external atmospheric pressure.

The differential pressure sensitive bellows may have a reciprocable stem 26 connected to it, which carries a control valve 27, movement of which is operable to regulate the compressor for limiting the quantity of gas withdrawn by it from the compartment 1 and transferred under pressure to the condenser 11. Two different types of operation by which the valve 27 may accomplish this regulation of the compressor are illustrated respectively by Figures 1 and 2.

In the control mechanism of Figure 1 the compressor 10 is illustrated as being driven at a constant speed by the motor 12 and gearing 13. In order to limit the reduction in pressure within the compartment 1 effected by operation of the compressor, therefore, some of the gas compressed by the compressor is released into the compartment 1 again instead of being transferred under pressure to the condenser. In order to reduce the work of the compressor as much as possible, such compressed gas preferably is released from the first stage 10a of the compressor.

Such release of compressed gas from the compressor's first stage is accomplished by connecting such first stage to a control conduit 28 having in it a port normally closed by valve 27. The exterior of such control conduit is in communication with the compartment 1 so that when the exterior pressure transmitted through conduit 25 to the interior of bellows 24 exceeds the pressure in compartment 1 the valve stem 26 will be reciprocated to withdraw valve 27 from its port for allowing gas compressed in the first stage 10a of the compressor to escape. As soon as sufficient gas has been released so that the compartment pressure has risen to equality with the external pressure or slightly above, the pressure of the compartment on the exterior of bellows 24 will close valve 27.

The bellows 24, therefore, constitutes control mechanism by which the pressure in compartment 1 can be varied as required to maintain its pressure substantially equal to the external atmospheric pressure. Alternatively, the bellows 24 may be of the normally expansive type, that is, being of resilient construction such as to tend to expand or may contain a compression spring tending to expand the bellows. Such expansive bellows will open valve 27 unless the pressure acting on the exterior of the bellows is higher than the external atmospheric pressure acting on the interior of the bellows by a predetermined increment. If such expansive bellows are used, the control mechanism would maintain the pressure in compartment 1 at a value always higher than the external atmospheric pressure by a predetermined increment.

The same type of differential pressure sensitive control means can effect such control of the compartment pressure by regulating the operation of the compressor 10 utilizing the actuating mechanism illustrated in Figure 2. In this instance the control conduit 28 having in it a port controlled by valve 27 is connected to a fluid pressure actuator 29 which in turn is connected to the compressor. In this instance the connection of the actuator 29 may be to the third stage of the compressor, which is also connected to the condenser, instead of being connected to the first stage of the compressor. The fluid actuator 29 is of the pneumatic type including a cylinder 30 in which a piston 31 reciprocates. The piston rod 32 is connected by suitable linkage 33 to the speed control lever 23 of the variable speed transmission 22. Stops may be provided in the cylinder 30 engageable by piston 31 to limit its movement in opposite directions under the influence of differential pressures on its opposite sides.

The actuator 29, which constitutes a pneumatic servomotor, is controlled by varying the differential in pressure on opposite sides of its pressure responsive member in the form of piston 31. At one side of this pressure responsive member is the reference pressure chamber 34, the pressure in which is always between high and low control pressures in the control pressure chamber 35 in communication with the other side of the pressure responsive member 31. Both of the chambers 34 and 35 may be connected to the same high pressure source, such as the compressor 10 by conduits 36 and 37, respectively, having in them restrictions or bleed orifices 38 and 39, respectively, which may be of the same size. A differential in pressure in the two chambers 34 and 35 for control purposes is then produced by controlling the outflow of gas from the chambers 34 and 35.

The control pressure chamber 35 of the actuator 29 is connected to the control conduit 28 by a conduit 40, which is relatively unrestricted. If the control conduit and its connecting conduit are sealed against escape of gas, the pressure in the control pressure chamber 35 will increase by flow of gas into it through conduit 37 and bleed 39 until its pressure is equal to the static high control pressure of gas flowing from the compressor 10. If bellows 24 should be operated by the differential pressure acting on it alone or in conjunction with the resilience of the bellows mechanism to open valve 27, gas would flow through connecting conduit 40 and control conduit 28 to the compartment 1 faster than the gas could be replaced in chamber 37 by gas passing through the bleed aperture 39. Consequently, the pressure would fall rather rapidly in chamber 35 until it reached a low control pressure value slightly above the pressure in compartment 1.

The pressure in the reference pressure chamber 34 should always be maintained at a value between the values of such high and low control pressures. This result is accomplished by allowing gas to escape continually from chamber 34 through an outlet conduit 41 having in it a restricted or bleed orifice 42. This conduit should be connected to a relatively low pressure region such as the compartment 1 or the external atmosphere. It is preferred that the connection be to the compartment 1 rather than to the external atmosphere to avoid loss of refrigerant. While the escape of gas through conduit 41 from chamber 34 will prevent the pressure in this chamber from rising to equality with the high control pressure in chamber 35, the pressure in chamber 34 will never drop to a value as low as the low control pressure in chamber 35 because of the restriction 42 in the outlet 41.

Whether the conduit 41 communicates with the external atmosphere or with the compartment 1, the pressure in the reference chamber 34 will fluctuate only as it is influenced by factors which affect correspondingly the high or low control pressure. Thus if the pressure in the reference chamber 34 drops because of reduction in atmospheric pressure or pressure in the compartment 1, the low control pressure would be reduced generally correspondingly because when valve 27 is open the value of such low pressure is determined principally by the pressure in the compartment 1, and the pressure in such compartment bears substantially a predetermined relationship to the external atmospheric pressure.

Alternatively, if the pressure of the gas compressed by compressor 10 as distributed to conduits 36 and 37 varies because of the change of pressure in compartment 1 such variation in pressure will occur to the same degree and simultaneously in both of such conduits. It is thus assured that the reference pressure in reference pressure chamber 34 will always be less than the high control pressure in control pressure chamber 35, occurring when control conduit 28 and connecting conduit 40 are sealed, and will always be higher than the low control pressure in chamber 35 effected when the control conduit 28 is vented. It is immaterial, therefore, that the high control pressure, the reference pressure and the low control pressure may fluctuate under different operating conditions because at any selected time such values will always bear the same relationship.

As long as the control conduit 28 is sealed, therefore, the connection 37 will maintain in chamber 35 a control pressure higher than the reference pressure in chamber 34. The differential in these pressures acting on the pressure responsive piston 31 will hold it fully to the right in the position shown in solid lines in Figure 2 to maintain the compressor drive speed control lever 23 in the high speed position shown in solid lines in Figure 2. As long as the control conduit 28 remains sealed, the relationship of the pressures in chambers 35 and 34 will remain unchanged irrespective of changes of pressure in the compartment 1 so as to maintain the speed of compressor 10 constant at high speed.

Alternatively, if control conduit 28 is vented, such as by valve 27 being opened by the action of pressure sensitive bellows 24, the pressure in the control pressure chamber 35 will quickly drop to a value less than that of the reference pressure in chamber 34. Thereupon the pressure responsive piston 31 will move from the solid line position shown in Figure 2 into the broken line position of that figure and thus reduce the speed at which compressor 10 is driven by motor 12. The rapidity with which vapor is withdrawn from compartment 1 will therefore be reduced correspondingly so that because of evaporation of refrigerant discharged through the nozzles 9 into the compartment, the pressure in it will rise.

Moreover, the escape of compressed gas to the compartment 1 through conduit 41 past bleed 42, and through the control conduit 28 past valve 27, will assist in increasing the pressure in the compartment. The larger the bleeds 38 and 39, the greater will be this flow from the compressor through the chambers of actuator 29 to the compartment.

The relationship of the pressures in the reference pressure chamber 34 and in the control pressure chamber 35 will not be altered by such reduction in the speed of compressor 10 because the pressure in both of these chambers will be reduced substantially correspondingly. Since the control pressure chamber will be vented to the compartment relatively unrestrictedly, past valve 27, whereas the communication between chamber 34 and the compartment 1 will be restricted by the bleed 42, the pressure in such reference pressure chamber will remain higher than the low control pressure in the control pressure chamber 35.

The same general type of control mechanism can be used for limiting the reduction in absolute pressure in the compartment 1 to a predetermined minimum absolute value. For this purpose absolute pressure sensitive means sensitive to the pressure in the compartment 1 are provided in the form of evacuated bellows 43 having its exterior exposed to the pressure within the compartment 1. To this bellows is connected the stem 44 carrying the valve 45 which is adapted to seat on and seal a second port in the control conduit 28. Such bellows may be of the expansive type so that when the pressure on their exterior has been reduced to a predetermined value, they will expand to reciprocate stem 44 and open valve 45. The expansive characteristics of such bellows means may be altered by connecting to the bellows a tension spring 46 tending to expand them, the anchored end of which spring may be connected to an adjusting screw 47 movable to vary the spring tension. Such adjustment will alter the value of the absolute pressure acting on bellows 43 which is required to maintain valve 45 closed.

When such absolute pressure sensitive control means are incorporated in the control mechanism of Figure 1, the bellows 43 will maintain the valve 45 seated to close its port in control conduit 28 until the aircraft ascends to an altitude at which the external atmospheric pressure is less than the pressure required to maintain bellows 43 compressed. While the external atmospheric pressure does not, of course, act directly upon such bellows, the pressure in compartment 1 will be at least as high as such external pressure so that as long as the external pressure is greater than that required to compress bellows 43, such absolute control means will remain inoperative. When the external atmospheric pressure becomes low enough so that the differential pressure sensitive means 24 will no longer be actuated to open valve 27, but the pressure in the compartment has been reduced by removal of gas from it by compressor 10 to a value such that bellows 43 is no longer held compressed, such bellows will expand even though bellows 24 does not.

The effect of bellows 43 opening valve 45 of the control mechanism shown in Figure 1 is the same as the effect of opening valve 27 as described above. A portion of the gas compressed by the compressor 10, preferably in the first stage, will be released from control conduit 28 so as to prevent further reduction in the absolute pressure in compartment 1. Such minimum absolute pressure will be predetermined or selected at a value which will enable the compressor to compress refrigerant gas effectively to be condensed in the condenser 11. Similarly, opening of valve 45 in the control mechanism shown in Figure 2 will produce a result like that of opening valve 27 to vent the control conduit 28, namely to effect reduction in speed of the compressor 10 by movement of the speed control lever 23 and to release to the compartment 1 through conduits 37 and 28 gas compressed by the compressor.

While it is preferred, as has been discussed above, to vent the control conduit 28 to the compartment 1, the passages 48 and 49 from the control conduit ports controlled by valves 27 and 45, respectively, can, if desired, communicate with the external atmosphere. In that case, utilizing the control mechanism of Figure 2, control of the pressure in compartment 1 would be effected only by speed regulation of compressor 10. If the ports 48 and 49 are connected to the external atmosphere, however, loss of refrigerant would occur which ordinarily is not desired.

By utilization of the mechanism described, therefore, maximum cooling effect of the refrigeration mechanism is available at all times by maintaining the pressure within the compartment being cooled at as low a value as possible without being reduced below external atmospheric pressure and without being reduced below a predetermined minimum value below which the operating efficiency of the compressor and condenser would be impaired.

It is always possible that for some reason the control mechanism described above will not operate or will not operate sufficiently rapidly. Thus, for example, when the aircraft is descending rapidly so that the external atmospheric pressure is increasing quickly, it is possible that the increase in pressure within compartment 1 even effected by the combined evaporation of refrigerant discharged into the compartment by nozzles 9 and the release of refrigerant compressed by the compressor 10 will not keep pace with the increase in external pressure. To prevent the increase in pressure within compartment 1 from lagging behind the increase in ambient external atmospheric pressure under such circumstances, for example, an automatically operable emergency relief valve 50 is provided which will open to admit atmospheric or pressurized air from any suitable source into the compartment 1 if for any reason its pressure should drop a predetermined small increment below the ambient external atmospheric pressure.

It is also possible that by failure of the compressor 10 or its drive mechanism or for some other reason the pressure within the compartment 1 may not be reduced nearly as rapidly as the drop in external atmospheric pressure resulting from increase in altitude of the aircraft. Under such circumstances it is undesirable for the pressure in the compartment 1 to exceed the external atmospheric pressure by more than a predetermined increment. The emergency relief valve or another valve under such circumstances can be operable automatically to release gas from the compartment 1 to the external atmosphere or to any other suitable low pressure region as may be necessary to prevent the predetermined maximum differential between compartment pressure and external atmospheric pressure being exceeded.

I claim as my invention:

1. Mechanism for cooling heat-generating equipment in an aircraft compartment, comprising spray means directing sprays of liquid refrigerant onto such heat-generating equipment for cooling the same, such refrigerant being evaporated into the compartment containing such heat-generating equipment by heat removed therefrom, compressor means operable to withdraw evaporated refrigerant from the compartment, condenser means operable to condense refrigerant compressed by said compressor means, and control means operable to limit the reduction in compartment pressure by controlling operation of said compressor means to curtail transfer of refrigerant from the compartment to said condenser means.

2. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, and differential pressure sensitive control means exposed to the pressure in the compartment and to the external ambient atmospheric pressure and operable to limit the reduction in compartment pressure to a value at least not appreciably below external ambient atmospheric pressure by controlling operation of said compressor means to curtail transfer of refrigerant from the compartment to said condenser means.

3. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, absolute pressure sensitive control means exposed to the pressure in the compartment and operable to limit the reduction in compartment pressure to a predetermined minimum absolute pressure by controlling operation of said compressor means to curtail transfer of refrigerant from the compartment to said condenser means, and adjusting means operable to adjust said absolute pressure sensitive control means to alter the value of the predetermined minimum absolute pressure in the compartment effected by said compressor means controlled by said absolute pressure sensitive control means.

4. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, differential pressure sensitive control means exposed to the pressure in the compartment and to the external ambient atmospheric pressure and operable to limit the reduction in compartment pressure to a value at least not appreciably below external ambient atmospheric pressure by controlling operation of said compressor means to curtail transfer of refrigerant from the compartment to said condenser means, and absolute pressure sensitive control means exposed to the pressure in the compartment and operable to limit the reduction in compartment pressure to a predetermined minimum absolute pressure irrespective of the operation of said differential pressure sensitive control means by controlling operation of said compressor means to curtail transfer of refrigerant from the compartment to said condenser means.

5. Mechanism for cooling heat-generating equipment in an aircraft compartment, comprising spray means directing sprays of liquid refrigerant onto such heat-generating equipment for cooling the same, such refrigerant being evaporated into the compartment containing such heat-generating equipment by heat removed therefrom, compressor means operable to withdraw evaporated refrigerant from the compartment, condenser means operable to condense refrigerant compressed by said compressor means, and control means operable to release to the compartment gas withdrawn therefrom and compressed by said compressor means to limit the reduction in compartment pressure.

6. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, and differential pressure sensitive control means exposed to the pressure in the compartment and to the external ambient atmospheric pressure and operable to release to the compartment gas withdrawn therefrom and compressed by said compressor means to limit the reduction in compartment pressure to a value at least not appreciably below external ambient atmospheric pressure.

7. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, and differential pressure sensitive control means exposed to the pressure in the compartment and to the external ambient atmospheric pressure and operable to reduce the speed of said compressor means to limit the reduction in compartment pressure to a value at least not appreciably below external ambient atmospheric pressure.

8. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, differential pressure sensitive control means exposed to the pressure in the compartment and to the external ambient atmospheric pressure and operable to release to the compartment gas withdrawn therefrom and compressed by said compressor means to limit the reduction in compartment pressure to a value at least not appreciably below external ambient atmospheric pressure, and absolute pressure sensitive control means exposed to the pressure in the compartment and operable to release to the compartment gas withdrawn therefrom and compressed by said compressor means to limit the reduction in compartment pressure to a predetermined minimum absolute pressure irrespective of the operation of said differential pressure sensitive control means.

9. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, differential pressure sensitive control means exposed to the pressure in the compartment and to the external ambient atmospheric pressure and operable to reduce the speed of said compressor means to limit the reduction in compartment pressure to a value at least not appreciably below external ambient atmospheric pressure, and absolute pressure sensitive control means exposed to the pressure in the compartment and operable to reduce the speed of said compressor means to limit the reduction in compartment pressure to a predetermined minimum absolute pressure irrespective of the operation of said differential pressure sensitive control means.

10. Aircraft compartment cooling mechanism comprising means operable to evaporate refrigerant into the compartment for cooling the same, compressor means operable to withdraw evaporated refrigerant from the compartment, condenser means operable to condense refrigerant compressed by said compressor means, a pneumatic servomotor including a pressure responsive element movable to regulate the speed of said compressor means, means subjecting one side of said pressure responsive element to a reference pressure, and control means including pressure sensitive means exposed to the pressure in the compartment, and valve means movable by said pressure sensitive means and operable in one position to subject the other side of said servomotor pressure responsive element to a control pressure higher than said reference pressure for changing the speed of said compressor in one direction and operable in another position for subjecting such other side of said pressure responsive element to a control pressure lower than said reference pressure for changing the speed of said compressor means in the opposite direction.

11. The aircraft compartment cooling mechanism defined in claim 10, in which the pressure responsive element is received in a casing having chambers at opposite sides thereof, the reference pressure being established in one of said chambers by establishing restricted communication between said one chamber and a relatively high pressure source and restricted communication between such one chamber and a relatively low pressure region, and control pressure is established in the other chamber by providing restricted communication between such other chamber and said relatively high pressure source, and the pressure sensitive means controls discharge of fluid from such other chamber to a relatively low pressure region.

12. The aircraft compartment cooling mechanism defined in claim 11, in which the relatively high pressure source in restricted communication with both chambers is the compressor means.

13. Aircraft compartment cooling mechanism comprising means operable to evaporate refrigerant into the compartment for cooling the same, compressor means operable to withdraw evaporated refrigerant from the compartment, condenser means cooled by fuel for the aircraft and operable to condense refrigerant compressed by said compressor means, and control means operable to limit the reduction in compartment pressure by controlling operation of said compressor means to curtail transfer of refrigerant from the compartment to said condenser means.

14. Aircraft compartment cooling mechanism comprising means operable to evaporate refrigerant into the compartment for cooling the same, compressor means operable to withdraw evaporated refrigerant from the compartment, condenser means receiving refrigerant compressed by said compressor means and including heat exchange means through which fuel for the aircraft is moved to cool such compressed refrigerant and to condense it, and control means operable to limit the reduction in compartment pressure by controlling operation of said compressor means to curtail transfer of refrigerant from the compartment to said condenser means.

15. Aircraft compartment cooling mechanism comprising means operable to evaporate refrigerant into the compartment for cooling the same, compressor means operable to withdraw evaporated refrigerant from the compartment, an aircraft fuel tank, condenser means located within said fuel tank, receiving refrigerant compressed by said compressor means and operable to condense such refrigerant cooled by fuel in said fuel tank, and control means operable to limit the reduction in compartment pressure by controlling operation of said compressor means to curtail transfer of refrigerant from the compartment to said condenser means.

References Cited in the file of this patent

UNITED STATES PATENTS

| 942,499 | Heinrich | Dec. 7, 1909 |
| 2,083,611 | Marshall | June 15, 1937 |
| 2,344,215 | Soling | Mar. 14, 1944 |
| 2,440,930 | Camilli | May 4, 1948 |
| 2,561,876 | Leonard | July 24, 1951 |
| 2,643,282 | Greene | June 23, 1953 |